United States Patent Office 3,403,192
Patented Sept. 24, 1968

3,403,192
SULFUR-PROMOTED OXIDATIVE DEHYDRO-
GENATION PROCESS
Mohan Vadekar and Israel Szabsaj Pasternak, Sarnia, On-
tario, Canada, assignors to Esso Research and Engineer-
ing Company, a corporation of Delaware
No Drawing. Continuation-in-part of application Ser. No.
443,683, Mar. 29, 1965. This application Nov. 1, 1967,
Ser. No. 679,645
38 Claims. (Cl. 260—666)

ABSTRACT OF THE DISCLOSURE

Organic compounds having at least one

groupings are dehydrogenated in the vapor phase, over a low surface area catalyst, by reaction with hydrogen sulfide and oxygen and/or sulfur oxides. The product is useful as intermediates in a variety of applications.

CROSS REFERENCE

This application is a continuation-in-part of Ser. No. 443,683, filed Mar. 29, 1965, now abandoned.

FIELD OF INVENTION

This invention relates to a process for the dehydrogenation of organic compounds. More particularly, this invention relates to the catalytic vapor phase dehydrogenation of organic compounds in the presence of hydrogen sulfide and oxygen and/or an oxide of sulfur.

PRIOR ART

Oxidative dehydrogenation is a well-known process for converting saturated or partially saturated organic compounds to corresponding compounds containing a greater degree of unsaturation. This process is illustrated by the halogen-promoted dehydrogenation reactions, e.g., U.S. Patent No. 3,211,800, which involves the regeneration of halogens during the reaction by a process similar to the Deacon process. While such processes have achieved technical success, they normally require the use of relatively expensive halogens. Dehydrogenation reactions utilizing sulfur oxides are also known to the art, e.g., U.S. Patent Nos. 2,867,677, 2,418,374, 2,423,418, 2,720,550, etc. However, these processes have generally involved the use of sulfur oxides alone. Consequently, the yield of dehydrogenated product has usually been rather low and organic sulfide compounds, formed as by-products, have hindered the reaction. In these reactions, any hydrogen sulfide formed as a reaction product must be separately oxidized back to the sulfur oxide prior to reuse. A recent patent, U.S. 3,247,278, discloses the use of oxygen and hydrogen sulfide for the dehydrogenation of hydrocarbons over large pore molecular sieve catalysts. Nevertheless, the yield of unsaturated product was relatively low, for reasons which will be discussed below. Now, by following the inventive process described herein, sulfur-promoted oxidative dehydrogenation is shown to be a practical process which produces unsaturated products having the same number of carbon atoms as the less unsaturated feed in relatively high yields and utilizing a relatively inexpensive and readily available promoter. The utility of the products produced herein is readily seen as monomers for polymerization reactions, as well as intermediates for a variety of chemical reactions, e.g., alkylation, preparation of acids, cyanides, etc.

SUMMARY OF THE INVENTION

Therefore, in accordance with this invention, organic compounds can be dehydrogenated catalytically in a vapor phase reaction by reacting the organic compound with hydrogen sulfide and an oxidizing agent selected from the group consisting of oxygen, sulfur oxides, and mixtures thereof. In this manner, a product which is more highly unsaturated than the feed stock is prepared. It is believed that a reactive sulfur species, i.e., $S_2$, SH, or possibly $S_1$, is responsible for the dehydrogenation and that such species are obtained as illustrated by the following equations:

$$H_2S + \tfrac{1}{2} O_2 \rightarrow H_2O + S \qquad (1)$$

$$2H_2S + SO_2 \rightarrow 2H_2O + 3S \qquad (2)$$

$$3H_2S + SO_3 \rightarrow 3H_2O + 4S \qquad (3)$$

Thus, the reactive sulfur species is formed in situ and thereafter reacts with the organic feed in accordance with the following illustrative equation:

$$S + RCH_2CH_3 \rightarrow RCH=CH_2 + H_2S \qquad (4)$$

Thus, the normal products from the single stage reaction are then comprised of water, hydrogen sulfide, and an unsaturated organic compound.

In a particularly preferred embodiment of this invention, the dehydrogenation of the organic feed stock is effected by reacting it with hydrogen sulfide, oxygen, and a sulfur oxide. By combining the oxygen and sulfur oxide as oxidizing agents for the hydrogen sulfide two distinct advantages are obtained: (1) because the use of oxygen alone results in an exothermic reaction and the use of sulfur oxides alone results in an endothermic reaction, adiabatic reaction conditions can be achieved py adjusting the oxygen flow and balancing the reactions, thereby eliminating heat transfer problems in the catalyst bed (and allowing the use of fixed beds and conventional reactor systems rather than more costly fluidized or moving beds or unconventional reactor systems); and (2) sulfur oxides have a tendency towards catalyst deactivation which leads to low yields; however, the additional presence of oxygen helps to maintain catalytic activity, thereby maintaining the relatively high yields of this process.

A wide variety of organic feed stocks may be dehydrogenated by the process of this invention. Generally, the organic feed stocks are characterized by having at least one

grouping, i.e., adjacent carbon atoms having at least one hydrogen atom. Such compounds may contain, in addition to carbon and hydrogen, other elements such as halogen, nitrogen, and sulfur. Among the classes of organic compounds that may be dehydrogenated are: alkanes, alkenes, alkylhalides, ethers, esters, aldehydes, ketones, organic acids, alkylheterocyclics, cyanoalkanes, and the like. Illustrative of the conversions that may be effected are ethylbenzene to styrene, ethylcyclohexane to styrene, cyclohexane to cyclohexene and benzene, cyclopentane to cyclopentene and/or cyclopentadiene, ethane to ethylene, propane to propylene, butane to butenes and/or butadiene, methylbutene to isoprene, propionaldehyde to acrolein, ethyl chloride to vinylchloride, methylisobutyrate to methylmethacrylate, propionic acid to acrylic acid, ethylpyridine to vinylpyridine, and the like. Preferred feed stocks are $C_2$–$C_{20}$ organic compounds, particularly $C_2$–$C_{20}$ hydrocarbons, more particularly $C_2$–$C_8$ hydrocarbons. Of these preferred compounds, aliphatic compounds or compounds with aliphatic chains are most preferred. The process of the invention has found particular advantage for dehydrogenating $C_2$–$C_6$ paraffins, $C_4$–$C_6$ monoolefins, $C_6$–$C_8$ naphthenes and $C_8$–$C_{10}$ alkylaromatics. In another embodiment, $C_6$–$C_8$ alkanes or alkenes can be converted to the corresponding aromatic compound via dehydrocyclization. In yet another embodiment, the process of this invention can be embodyed to accomplish simultaneously dimerization and dehydrogenation. For example, propylene may be converted to benzene and isobutylene to xylenes.

In order to achieve the excellent conversions and yields obtainable in sulfur-promoted oxidative dehydrogenation, it is essential to employ a catalyst. Generally, any low surface area catalyst can be employed to enhance the reaction. Various catalyst systems can be utilized herein; however, a critical requiremnt of the catalyst is that it not only catalyze the desired reaction, but also inhibit undesirable side reactions such as cracking and/or burning, thereby permitting the most effective use of the catalysts. Many catalysts and/or materials that could be used as catalyst supports can be employed. Burning and/or cracking of the feed may also be inhibited by using low surface catalysts, impregnating large surface area materials with inert materials to effectively reduce the surface area, adjusting catalyst pore sizes, e.g., as in molecular sieves, so as to preclude the admittance of the feed stocks, etc. Preferred catalysts may be generally characterized as difficulty reducible oxides, or chlorides, which can be used as carriers or catalyst supports, but not necessarily limited thereto, and are normally selected from the oxides of Groups II, III, IV, V, and VI–B, and the chlorides of Groups I–A, II–A, and VI–B of the Periodic Chart of the Elements, though the oxides of Groups II, III–A, and IV–B are more preferred. Group III–A oxides, particularly alumina and its derivative forms, e.g., alundum, but most particularly alumina, are quite outstanding from a cost-effectiveness standpoint and are readily available. Examples of some of the materials that are employed are: alumina, silica, silica-alumina, celite, pumice, magnesia, titania, silicon carbide, coke, carbon, tungsten oxide, and the like. These materials are differentiated from molecular sieves in that they are all low surface area materials whereas zeolites are generally high surface area materials and require special conditions to reduce their effective surface area. Of these, magnesia, carbon and alumina are the most preferred, alumina being still more preferred. When alumina is employed, it has been found that its surface area, as measured by nitrogen adsorption, should be relatively low, and range from about 0.01 to about 100 m.$^2$/g., preferably about 0.05–20 m.$^2$/g., and more preferably 0.5–12 m.$^2$/g. However, the optimum surface area for alumina is not necessarily the same for other materials. Nevertheless, one skilled in the art will readily determine the proper surface area which inhibits cracking and/or burning and uses the catalyst at peak efficiency. However, as a general rule, lower surface areas reduce cracking and/or burning and, therefore, surface areas should generally be below about 100 m.$^2$/g., preferably below about 50 m.$^2$/g. more preferably below about 20 m.$^2$/g., depending, of course, on the particular material employed. The surface area of high surface area materials may be reduced by any of the techniques mentioned above. However, it is also possible to reduce surface area by heat treating the material, for example, a 265 m.$^2$/g. alumina heated for several hours at about 2000° F. will result in a catalyst of optimum surface area and will give excellent dehydrogenation reactions.

Reasonably high conversions and yields can be effected by simply employing the above-disclosed catalytic materials. Nevertheless, it is advantageous to utilize an additional catalyst to increase the conversions and yields that may be obtained. A wide variety of metals, their salts, oxides, or hydroxides can be used for this purpose. When utilizing additional catalytic materials, the weight ratio of additional catalyst or catalysts to support may vary from 0.001 to 1.0, preferably from 0.01 to 0.25. The additional metals or metal compounds are preferably solid at reaction temperatures, but may be molten, e.g., antimony. Metals or metal compounds that are gaseous at reaction temperatures, e.g., mercury, are not suitable and are, therefore, excluded from use. Suitable additional catalysts may be the metals, salts (e.g., chlorides, bromides, iodides, fluorides, phosphates), oxides, or hydroxides of the metals of Groups I–VIII, e.g., I–A, I–B, II–A, II–B, III–A, III–B, IV–A, IV–B, V–A, V–B, VI–A, VI–B, VII–B, and VIII. Many of the salts, hydroxides, or oxides of these metals may change during the preparation of the catalyst, during heating in the reactor, prior to, or during the reaction, or are converted to another form under the reaction conditions, but such materials still function as effective catalysts in this process. For example, various metal nitrates, nitrites, carbonates, hydroxides, acetates, sulfites, silicates, sulfides, and the like, are readily converted to the corresponding oxide, under the defined reaction conditions. Salts such as phosphates, sulfates and halides which are partially stable at reaction conditions are also effective catalysts. Preferred additional catalytic agents are the oxides, chlorides, and metals, still more preferred the chlorides and oxides, the oxides being most preferred. Some typical examples of the metals that may be used herein, as metals or as compounds as described, are: Group I–A, e.g., potassium; Group I–B, e.g., copper and silver; Group II–A, e.g. magnesium, barium, calcium; Group II–B, e.g., zinc, cadmium; Group III–A, e.g., aluminum, indium; Group III–B, e.g., lanthanum, didymium; Group IV–A, e.g., tin, lead; Group IV–B, e.g., titanium; Group V–A, e.g., antimony, bismuth; Group V–B, e.g., vanadium; Group VI–B, e.g., tungsten, chromium, molybdenum; Group VII–B, e.g. manganese; Group VIII, e.g., iron, nickel, cobalt. Of the additional agents that can be used herein, the Group I–A, II, V–B, and VI–B metals and their oxides, particularly the oxides are preferred for the dehydrogenation of aliphatic hydrocarbons such as $C_2$–$C_6$ paraffins or monoolefins, e.g., butane to butene to butadiene, more preferably Groups I–A and II–A metal oxides. Group II–B metals and their oxides, particularly the oxides are preferred for ethane dehydrogenation, e.g., cadmium, while alumina itself is normally preferred for the dehydrogenation of olefins, e.g., butene to butadiene, ethylbenzene to styrene. Ethylbenzene to styrene is also preferred promoted by rare earth chlorides or oxides, e.g., cerium oxide, didymium chloride or Alundum or alumina.

The metals, or compounds thereof, may be deposited onto the catalytic support material by any convenient method well known to those skilled in the art, e.g., impregnation, evaporation from a solution, etc.

The process of this invention is normally carried out in the presence of an inert diluent since the high temperatures of dehydrogenation reactions may be susceptible to explosion as well as cracking of the feed stock. Any inert diluent which may easily be separated from the reaction product is employable in the process of this invention. Typical examples of such materials are methane, waste gases containing methane and small quantities of other hydrocarbons, nitrogen, argon, steam, CO, $CO_2$, helium, $H_2S$ or mixtures of the above. Normally, the use of different diluents does not require any substantial change in the reaction conditions. The ratio of diluent to feed may vary over wide limits, e.g., at least 1 mole diluent per mole of feed to be dehydrogenated, more preferably 1 to 20 moles of diluent/mole of feed, and still more preferably about 3 to 10 moles of diluent/mole of feed. Reducing the total pressure in a reactor would have a similar effect to adding diluent but operating difficulties would be increased.

The active sulfur species for dehydrogenation are believed to be formed in situ by the reaction of hydrogen sulfide with an oxidizing agent, as illustrated by Equations 1, 2, and 3. The oxidizing agent may be selected from the group consisting of oxygen, oxides of sulfur, and mixtures thereof. The sulfur oxides to which this invention pertains are: sulfur dioxide ($SO_2$), sulfur trioxide ($SO_3$), and water solutions of these oxides, e.g., sulfuric acid ($H_2SO_4$), sulfurous acid ($H_2SO_3$).

The reactant ratios are an important feature of this invention if optimum selectivities and conversions are to be achieved. As noted above, in Equation 1 0.5 mole of active sulfur of oxygen is required to produce one mole of active sulfur from hydrogen sulfide, which, in turn, is required to abstract two hydrogen atoms and produce one mole of unsaturated product. However, satisfactory results can be achieved with an oxygen/feed mole ratio of at least about 0.1/1, preferably at least about 0.5/1. While the upper limit for the $O_2$/feed ratio is not critical, this ratio is usually adjusted to prevent excessive burning of the hydrocarbon to CO and $CO_2$. Quantities of oxygen up to about 1 mole per mole of hydrogen abstracted from the feed can be used. The molar ratio of oxygen to hydrogen sulfide is, however, quite important. The use of excessive amounts of oxygen in relation to hydrogen sulfide will result in the complete combustion of the hydrogen sulfide or sulfur dioxide and little active sulfur will be formed. Consequently, the mole ratio of $O_2/H_2S$ should be not more than about 1.5/1, preferably not more than about 1/1, and more preferably about 1/1 to 0.5/1, e.g., 0.8/1. Under these conditions $SO_2$ formation will be either small or negligible. Small amounts of $SO_2$ are not detrimental and, in fact, as indicated below, may be desirable since $SO_2$ can react with the remaining $H_2S$ to produce the active sulfur species. The utilization of excess amounts of hydrogen sulfide does not adversely affect the reaction and may be used as a suitable method for diluting the reaction mixture. Thus, hydrogen sulfide may be employed in diluent proportions either alone or in combinations with the other mentioned diluents, and mole ratios of $O_2/H_2S$ in the range of about 1.5/1 to 1/10, e.g., 1/2, may also be utilized herein.

Sulfur oxides may also be utilized in the process of this invention for producing the active sulfur species from hydrogen sulfide. As with oxygen, it has been found that satisfactory results can be achieved by utilizing less than the stoichiometric requirement for producing one mole of unsaturated feed stock. (For $SO_2$ one-third mole will produce one mole of unsaturate, for $SO_3$ one-fourth mole will produce one mole of unsaturate.) When utilizing sulfur oxides, the molar relationship of the oxide to feed may be as follows:

$SO_2$/feed—at least about 0.5/1, preferably at least about 0.3/1, more preferably about 0.4/1 to 1/1.

$SO_3$/feed—at least about 0.04/1, preferably at least about 0.25/1, more preferably about 0.3/1 to 0.8/1.

The molar ratio of $H_2S$ to sulfur oxide is somewhat less important here than when oxygen is utilized as the oxidizing agent. Nevertheless, molar ratios should be as follows:

$H_2S/SO_2$—At least about 0.03/1, preferably 0.03/1 to 10/1, more preferably 0.05/1 to 2/1, and still more preferably 0.1/1 to 1.5/1.

$H_2S/SO_3$—at least about 0.04/1, preferably 0.04/1 to 13/1, more preferably 0.06/1 to 3/1 and still more preferably 0.1/1 to 3/1.

When utilizing $H_2SO_4$, the molar relationship should be based on the amount of $SO_3$ present in the acid and shuold then be as specified above. Similarly, the moles of $H_2SO_3$ are based on $SO_2$ content of the acid.

It should be recognized that the molar relationships recited herein are those for removal of one mole of hydrogen from the organic feed, i.e., producing a linkage of

from a linkage of

If, however, more than one mole of hydrogen is to be abstracted, i.e., more than one olefinic linkage is to be formed, the molar ratio of oxidizing agent to feed will be adjusted accordingly.

Reaction conditions are also essential variables in the process of this invention. The relationship between temperature and both conversion and selectivity is important since at low temperatures no appreciable reaction takes place while at high temperatures the organic feed stock is susceptible to oxidative attack and cracking. A suitable temperature for the process of this invention is in excess of about 800° F., preferably 800°–1400° F., more preferably 950°–1300° F., e.g., 1150° F. The space velocity of reaction is dependent upon temperature, the higher temperatures requiring shorter contact times, and thus may vary from 0.05 to 2 weights of organic feed per weight of catalyst per hour, perferably 0.1 to 1 w./w./hr., more preferably 0.2 to 0.8 w./w./hr., e.g., 0.5 w./w./hr. Space velocities and temperatures will also vary with the type of feed stock utilized. For example, ethylbenzene is less sensitive to longer contact times than are butenes; however, butenes are less sensitive than butanes. Moreover, relatively stable compounds such as ethane require somewhat higher reaction temperatures, e.g., about 1300° F., but still within the broad range as specified. Nevertheless, one skilled in the art will easily determine the optimum reaction conditions for any feed stock, within the specified ranges. Reaction pressures are not critical and may vary widely, i.e., from subatmospheric to 50 atmospheres pressure, preferably 0.5 to 30 atmospheres, e.g., one atmosphere.

In a typical process scheme, the gaseous reactants in the ratios described above are heated to the retired temperature in a furnace and then fed to a reactor containing the oxidative dehydrogenation catalyst, e.g., low surface area alumina, in either a fixed or fluidized condition so that the $H_2S/O_2$ (or $SO_2$)/hydrocarbon reactions take place, as disclosed, to give high yields of the more unsaturated hydrocarbon product. The reactor effluent is then quenched, and, e.g., in the case of the production of butadiene from butene or butane, compressed to at least 40 p.s.i.g., cooled to 35° F. and the $C_4$ hydrocarbons separated from the $H_2S$ by absorption in a $C_8$ paraffin stream. The $H_2S$ (together with $CO_2$ and some light hydrocarbons) is recycled to the reaction system. The $C_4$ hydrocarbons are distilled from the heavy paraffin stream and the butadiene separated from the unreacted butene or butane. The latter can be heated and recycled to the reactor. It should be emphasized that any convenient processing scheme can be used to separate the hydrocarbons in the reactor effluent gas from the $H_2S$. The exact processing steps will, of course, depend upon the types of hydrocarbons involved and their molecular weight. The $C_4$ example is offered only as an illustration of the process scheme of this invention.

In a preferred embodiment, the dehydrogenation is effected by utilizing $O_2$, $H_2S$, and a sulfur oxide, e.g., $SO_2$, in combination to achieve the advanatages previously mentioned. To achieve adiabatic conditions in a dehydrogenation reactor using an ethylbenzene feed, for example, it can be calculated thermodynamically that the ethylbenzene/$O_2$/$SO_2$ mole ration should be about 1/0.15/0.24 with the $H_2S$/oxidant ratios as specified earlier. If n-butane is the hydrocarbon feed, for example, then the $O_2$ and $SO_2$ mole ratios should be approximately doubled and the n-butane/$O_2$/$SO_2$ mole ratio should be about 1/0.3/0.5. One skilled in the art can readily calculate the mole ratios of hydrocarbon/$O_2$/$SO_2$ needed to achieve adiabatic reaction conditions for a given feed stock.

The recovery scheme for this combination process is similar to that described above for reactions involving either oxygen or the sulfur oxide. In a variation, however, the recovered gases, i.e., $H_2S$, $SO_2$, and diluent, plus some light hydrocarbons, are split to provide a recycle stream containing the desired quantity of $H_2S$ and the remaining $H_2S$ is burned to $SO_2$. The sulfur oxide is then separated from the diluent gases by cooling and compression or by absorption in water and recycled to the reactor.

It should be noted that the use of oxygen alone provides for an exothermic reaction. Thus, any of the techniques designed to prevent temperature buildup in the catalyst bed may be employed, e.g., catalyst dilution with inert materials, spreading of the catalyst in a large number of small diameter, parallel fixed tubes, fluid bed techniques.

Some of the catalysts used in the process of this invention were prepared by impregnating a catalyst base with a predetermined quantity of an aqueous solution of the nitrate of the metal to be deposited. (Where the nitrate was not available, a slurry of the oxide and water was added to the support material and the water removed in a flash evaporator leaving the metal oxide on the catalyst surface.) The wet catalyst was flashed and water removed in vacuo. The dried catalyst was then heated in a current of air to convert the nitrate to the oxide.

The following examples will serve to further illustrate this invention. However, no limitations are to be implied, other than those in the appended claims, since variations will be obvious to those skilled in the art.

EXAMPLE 1

Ethylbenzene at a space velocity of 0.6 gram/gram of catalyst/hour was fed over 40.5 grams (50 cc.) of alumina having a surface area of 25 m.$^2$/gram contained in a reaction vessel. The reaction mixture was maintained at a temperature of 1150° F. an at atmospheric pressure. The results obtained from dehydrogenation are summarized below in Table I:

TABLE I

| Moles/Mole Ethylbenzene in Feed | | | Conversion, Mole Percent | Selectivity Styrene, Mole Percent | Styrene Yield, Mole Percent |
|---|---|---|---|---|---|
| $O_2$ | $H_2S$ | Helium | | | |
| 0.63 | | 9.3 | 47.1 | 64.0 | 30.2 |
| 0.63 | 0.63 | 9.3 | 80.7 | 92.0 | 74.3 |

The results indicate the promotive effect of $H_2S$ on the oxydehydrogenation of ethylbenzene.

EXAMPLE 2

The effect of oxygen concentration on dehydrogenation was studied by passing a mixture of 1-$C_4H_8$$H_2S$/He in mole ratio 1/1.2/10 over a 5% $CeO_2$ on a 1 m$^2$/gram alumina catalyst at 1080° F. and 0.5 gram butene/gram/hour space velocity in the presence of different quantities of oxygen. The results are summarized in Table II below:

TABLE II

| Run | M13 | M14 | M15 | M6 | M16 | M17 |
|---|---|---|---|---|---|---|
| Moles $O_2$/Mole $C_4$ | 0.25 | 0.4 | 0.6 | 0.75 | 0.9 | 1.2 |
| Percent Conversion of $C_4H_8$ | 28.5 | 40.2 | 46.5 | 65.0 | 56.0 | 54.2 |
| Percent Selectivity to $C_4H_6$ | 78.7 | 80.3 | 83.5 | 79.0 | 66.8 | 65.6 |
| Percent Yield $C_4H_6$ | 22.5 | 32.3 | 38.8 | 51.3 | 37.4 | 35.5 |

The results clearly indicate that the optimum conversions and selectivities are obtained when the $O_2$/feed stock ratio is in the range of 0.5 to 0.75.

EXAMPLE 3

The effect of $H_2S$ concentration on dehydrogenation was studied by passing a mixture of 1-$C_4H_8$/$O_2$ in mole ratio 1/.75 over a 5% $CeO_2$ on 1 m$^2$/gram alumina catalyst at 1080° F. and 0.5 gram butene/gram/hour space velocity in the presence of different quantities of $H_2S$ and helium diluent. The results are summarized in Table III below:

TABLE III

| Moles/Mole Butene | | Conversion, Mole Percent | Selectivity, Mole Percent | Yield, Mole Percent |
|---|---|---|---|---|
| $H_2S$ | Helium | | | |
| 0 | 11.0 | 42.6 | 31.9 | 13.6 |
| 0.2 | 10.8 | 58.5 | 65.6 | 38.4 |
| 0.5 | 10.5 | 62.8 | 74.1 | 46.6 |
| 1.0 | 10.0 | 58.7 | 75.9 | 44.6 |
| 1.2 | 9.8 | 65.0 | 79.0 | 51.3 |
| 1.5 | 9.5 | 67.5 | 78.5 | 53.0 |
| 2.0 | 9.0 | 64.1 | 76.3 | 48.9 |
| 2.5 | 8.5 | 66.7 | 77.5 | 51.7 |
| 3.0 | 8.0 | 62.9 | 82.0 | 51.6 |
| 4.0 | 7.0 | 60.9 | 80.4 | 48.9 |
| 5.0 | 6.0 | 62.8 | 85.4 | 53.7 |

The results clearly indicate that molar excesses of $H_2S$ do not adversely affect product selectivities or yields and that these excesses may serve to susbtantially reduce any need for additional diluents.

Example 4

An ethylbenzene/$H_2S$/$O_2$/He feed mixture in the mole ratio of 1/1/0.6/10 was passed over a 10 m.$^2$/gram alumina catalyst at 1150° F. and a space velocity of 0.6 w./w./hr. The product off-gas was analyzed and found to contain high yields of styrene and $H_2S$ but no $SO_2$. When the experiment was rerun with the omission of ethylbenzene from the feed mixture, the resulting products were elemental sulfur and water. These results indicate that the utilization of the proper reactant ratios as described earlier in this specification insure that $SO_2$ is not a final product of the reaction and that the maximum quantity of reactive sulfur is formed.

Example 5

In an experiment similar to Example 4 an ethylbenzene/$H_2S$/$SO_2$/He feed in a mole ratio of 1/0.5/0.3/10.8 resulted in a 75% conversion of the hydrocarbon feed with an 88% selectivity to styrene. The results indicate that $H_2S$+$SO_2$ is an effective dehydrogenation system.

Example 6

The effect of the catalyst support on dehydrogenation was determined by passing a feed mixture of

1-$C_4H_8$/$H_2S$/$O_2$/$N_2$ in mole ratios of 1/1/0.75/2.8 over various catalyst bases at the noted conditions. The results are summarized in Table IV below:

TABLE IV

| Run No. | 72 | 42 | 54 | | | | 46 | A21 |
|---|---|---|---|---|---|---|---|---|
| Catalytic Base | Alundum Pellets | Alcoa T61 Al₂O₃ [1] | Crushed Porcelain | | | | Davison [2] Alumina 1/16' Extrudate | Magnesia |
| Surface Area | <0.1 m.²/g. | <0.04 m.²/g. | <0.01 m.²/g. | | | | 20 m.²/g. | 48 m.²/g. |
| Temperature, °F | 1,060 | 1,200 | ←—— | ——970— | ——— | ——→ | 970 | 970 | 1,200 |
| Space Velocity w./w./hr. | 0.75 | 0.75 | 0.5 | 0.63 | 0.75 | 0.88 | 0.63 | 0.75 | 0.75 |
| Percent C₄H₈ Conversion | 44.0 | 44.0 | 34.9 | 38.3 | 39.2 | 37.6 | 15.6 | 68.5 | 66.9 |
| Selectivity to C₄H₆, Percent | 54.4 | 51.0 | 11.8 | 10.8 | 10.9 | 9.5 | 59.2 | 76.6 | 84.4 |
| Yield C₄H₆, Percent | 25.0 | 23.2 | 4.1 | 3.9 | 4.3 | 3.6 | 9.2 | 52.6 | 56.5 |

[1] Alcoa T61 is hard granular alumina with 99.5% Al₂O₃ content and very low (0.04 m.²/g. surface area). [2] Davison Alumina SMR-55 1/16' Extrudate was heat treated at 1,960° F. for 5 hours to produce the desired surface area. Alumina content of this base was >99%.

The results indicate the effect of surface area and type of support on selectivities and conversions to the desired product.

Example 7

A further investigation of the effect of surface area was carried out employing the Davison Alumina SMR-55 support of Example 6 on a feed mixture having 1-C₄H₈/H₂S/O₂/He feed molar ratio of 1/1/0.75/10. A temperature of reaction was maintained at 1060° F. and the space velocity was 0.4 w./w./w./hr. The results obtained upon varying the surface area are summarized in Table V.

TABLE V

| Run No | 54 | M24 | M26 | M28 | M30 | M32 | M34 |
|---|---|---|---|---|---|---|---|
| Al₂O₃ Surface Area m.²/g. | 1.4 | 4.9 | 9.8 | 25.0 | 42.2 | 58.3 | 65.8 | 74.3 |
| Percent Conversion of C₄H₈ | 71.3 | 60.8 | 61.9 | 56.6 | 53.1 | 50.8 | 47.8 | 50.0 |
| Percent Selectivity to C₄H₆ | 71.3 | 78.3 | 75.1 | 63.6 | 58.5 | 67.5 | 60.8 | 51.7 |
| Percent Yield of C₄H₆ | 50.7 | 47.4 | 46.5 | 36.0 | 31.1 | 34.3 | 29.0 | 26.1 |

The results indicate that the utilization of an alumina support having a surface area of approximately below about 12 m.²/gram results in optimum yields.

Example 8

The effect of a variety of catalysts on the dehydrogenation of butene was determined by passing a feed mixture of 1-C₄H₈/H₂S/O₂/N₂ in mole ratio of 1/1/0.75/2.8 at a temperature of 1060° F. and a space velocity of 0.75 w./w./hr. over an Alundum support impregnated with 5 wt. percent of various metal oxides. The results are summarized in Table VI.

TABLE VI

| Run No | 72B | 77B | 80B | 81B | 85B | 86B |
|---|---|---|---|---|---|---|
| Catalytic metal oxide | (¹) | CeO₂ | V₂O₅ | MoO₃ | CaO | MgO |
| Percent Conversion of C₄H₈ | 45.7 | 58.8 | 30.3 | 30.6 | 69.3 | 53.5 |
| Percent Sielectivity to C₄H₆ | 53.5 | 59.6 | 77.5 | 72.4 | 68.8 | 84.4 |
| Percent Yield of C₄H₆ | 25.0 | 35.1 | 23.4 | 22.2 | 47.7 | 45.4 |

¹ None Support.

The results in Table VI clearly indicate the superiority of cerium oxide and the Group II-A, V-B and VI-B metal oxides as catalysts for the dehydrogenation reaction. The Group V-B and VI-B metal oxides allowed a high butadiene selectivity to be achieved.

Example 9.—Ethane dehydrogenation

The following tables, VII-XV, illustrate the dehydrogenation of ethane in accordance with this invention using various supports and various additional catalysts.

TABLE VII.—ETHANE DEHYDROGENATION WITH H₂S AND O₂

Catalyst—Heat treated Davison Al₂O₃ [1]
Surface area=5.8 m.²/g.
C₂/H₂S/O₂ mole ratio=1/1.5/.75

| Run No. | Temp., °F. | Ethane Sp. Vel., v./v./Hr. | Moles Helium per mole Ethane | Ethane Conversion, percent | Ethylene Selectivity, percent | Ethylene Yield, percent |
|---|---|---|---|---|---|---|
| FE1-J | 1,250 | 50 | 2.9 | 52.9 | 67.2 | 35.6 |
| FE1-I | 1,350 | 50 | 2.9 | 86.2 | 55.0 | 47.5 |
| FE1-E | 1,250 | 100 | 10.0 | 70.5 | 35.7 | 25.2 |
| FE1-F | 1,350 | 100 | 10.0 | 81.1 | 50.7 | 41.1 |

[1] Heated in air to 2,000° F. for 11 hours.

TABLE VIII.—ETHANE DEHYDROGENATION WITH H₂S AND SO₂

Catalyst—heat treated Davison Al₂O₃
Surface Area—5.8 m.²/g.
Temperature—1300°F.
Ethane space velocity—100 v./v./Hr.

| Run No. | Moles/Mole Ethane | | | Ethane Conversion, Percent | Ethylene Selectivity, Percent | Ethylene Yield, Percent |
|---|---|---|---|---|---|---|
| | H₂S | SO₂ | He | | | |
| FE2-H | 0.5 | 1.0 | 8 | 77.3 | 51.5 | 39.8 |
| FE2-I | 0.2 | 0.5 | 8 | 61.6 | 57.1 | 35.2 |
| FE2-J | 0.2 | 0.5 | 4 | 66.5 | 68.0 | 45.2 |

TABLE IX.—INFLUENCE OF ALUMINA SURFACE AREA ON ETHANE DEHYDROGENATION

| | Temp., °F. | Ethane Space Vel., v./v./Hr. | Moles/Mole Ethane | | | | Ethylene Yield Percent | |
|---|---|---|---|---|---|---|---|---|
| | | | H₂S | O₂ | SO₂ | He | High SA Al₂O₃ [1] | Low SA Al₂O₃ [2] |
| A | 1,350 | 100 | 1.5 | 0.75 | | 10.0 | 36.9 | 41.1 |
| B | 1,350 | 50 | 1.5 | 0.75 | | 2.9 | 23.8 | 47.5 |
| C | 1,300 | 100 | 0.0 | | 0.5 | 4.0 | 36.0 | 45.2 |
| D | 1,300 | 100 | 0.5 | | 1.0 | 8.0 | 33.8 | 39.8 |

[1] Surface area 57 m.²/g.
[2] Surface area 5.8 m.²/g.

The data shown in Table IX clearly indicate that low surface area catalysts are essential in the dehydrogenation of ethane.

TABLE X

Catalyst—Davison alumina, 5.8 m.²/g. containing 5 wt. percent metal
Temperature—1300° F., ethane space velocity—100 v./v./hr.

| Run No. | Catalytic Metal | Ethylene Yield, percent | |
|---|---|---|---|
| | | $H_2S/O_2$ [1] | $H_2S/SO_2$ [2] |
| 26 | Ti (IV-B) | 64 | 62 |
| 7 | Mn (VII-B) | 52 | 53 |
| 8 | Fe (VIII) | 47 | 46 |
| 11 | Cu (I-B) | 60 | 63 |
| 15 | Ag (I-B) | 60 | 43 |
| 33 | Au (I-B) | 49 | 41 |
| 12 | Zn (II-B) | 58 | 65 |
| 16 | Cd (II-B) | 60 | 65 |
| 19 | In (III-A) | 64 | 58 |
| 20 | Sn (IV-A) | 64 | 54 |
| 22 | Pb (IV-A) | 61 | 52 |
| 21 | Sb (V-A) | 71 | 76 |
| 23 | Bi (V-A) | 57 | 54 |
| | Alumina | [3] 41 | 45 |

[1] $C_2H_2S/O_2/He$ mole ratio=1/1.5/0.75/10.
[2] $C_2/H_2S/SO_2/He$ mole ratio=1/0.2/0.5/4.
[3] At 1,350° F.

The data shown above indicate the increase in ethylene yields using the metals shown over that obtained with alumina alone.

TABLE XI.—INFLUENCE OF CADMIUM CONCENTRATION ON ETHYLENE YIELDS

Catalyst base—heat treated Davison $Al_2O_3$
Surface area=4.4 m.²/g.
Temperature=1300° F.
Ethane space velocity=100 v./v./hr.

| Run No. FE | Cadmium Conc. on Base Wt., Percent | Ethylene Yields, Percent | |
|---|---|---|---|
| | | $H_2S/O_2$ [1] | $H_2S/SO_2$ [2] |
| 28 | 2.5 | 65 | 69 |
| 29 | 5.0 | 64 | 73 |
| 30 | 10.0 | 66 | 64 |
| 31 | 15.0 | 61 | 68 |
| 32 | 25.0 | 46 | 30 |

[1] $C_2/H_2S/O_2/He$=1/1.5/0.75/10.
[2] $C_2/H_2S/SO_2/He$=1/0.2/0.5/4.

The data clearly show that the best results are obtained when the weight concentration is in the lower ranges, also that Group II–B metals, e.g., Cd is a preferred catalyst for ethane dehydrogenation.

TABLE XII.—EFFECT OF SURFACE AREA OF ALUMINA CATALYST BASE ON ETHYLENE YIELD

Catalyst—2.5 wt. percent Cd on $Al_2O_3$
Temperature=1300° F.
Ethane space velocity=100 v./v./hr.

| Run No. FE | $Al_2O_3$ Cat. Base | Surface Area, m²/g. | Ethylene Yields, percent | |
|---|---|---|---|---|
| | | | $H_2S/O_2$ [1] | $H_2S/SO_2$ [2] |
| 34 | Alcoa T-61 | 0.4 | 63 | 71 |
| 35 | Davison | 3.8 | 54 | 51 |
| 36 | Harshaw | 5-6 | 53 | 50 |
| 37 | do | 57 | 47 | 41 |
| 38 | Davison | 256 | 9 | 5 |

[1] $C_2/H_2S/O_2/He$=1/1.5/0.75/10.
[2] $C_2/H_2S/SO_2/He$=1/0.2/0.5/4.

The data shown here further illustrate the effect of surface area on ethylene yields and indicate the preferred range.

TABLE XIII.—EFFECT OF DIFFERENT CATALYST SUPPORTS ON ETHANE DEHYDROGENATION

Catalyst—2.5 wt. percent Cd on base
Temperature=1,300° F.
Ethane space velocity=100 v./v./hr.

| Run No. FE | Catalyst Base | Surface Area, m²/g. | Ethylene Yields, percent | |
|---|---|---|---|---|
| | | | $H_2S/O_2$ [1] | $H_2S/SO_2$ [2] |
| 34 | Alcoa $Al_2O_3$, T-61 | 0.04 | 63 | 71 |
| 39 | Filtros $SiO_2$, FS-140-L | 0.88 | 69 | 76 |
| 40 | Norton Alundum, SA-5103 | <1 | 65 | 80 |

[1] $C_2/H_2S/O_2/He$=1/1.5/0.75/10.
[2] $C_2/H_2S/SO_2/He$=1/0.2/0.5/4.

Table XIII shows that support materials other than alumina may be employed to promote dehydrogenation.

TABLE XIV.—EFFECT OF TEMPERATURE AND SPACE VELOCITY ON ETHANE DEHYDROGENATION

Catalyst—2.5 wt. percent Cd on Alundum
$C_2/H_2S/O_2/He$=1/1.5/0.75/2.9

| Run No. FE 40 | Temperature, ° F. | Ethane Space Vel. | Ethane Conv., percent | Ethylene Sel., percent | Ethylene Yield, percent |
|---|---|---|---|---|---|
| G | 1,300 | 100 | 88 | 83 | 72 |
| C | 1,200 | 50 | 81 | 83 | 67 |
| E | 1,100 | 50 | 55 | 78 | 43 |
| F | 1,000 | 25 | 71 | 80 | 57 |

TABLE XV.—EFFECT OF STEAM DILUENT ON ETHYLENE YIELDS

Catalyst—2.5% Cd on Alundum
Temperature—1300 ° F.

| Run No. FE 44 | Ethane Space Velocity, v./v./Hr. | Moles/Mole Ethane | | | | Ethane Conversion, Percent | Ethylene Selectivity, Percent | Ethylene Yield, Percent |
|---|---|---|---|---|---|---|---|---|
| | | $H_2S$ | $O_2$ | He | $H_2O$ | | | |
| B | 100 | 1.5 | 0.75 | 2.7 | | 94 | 83 | 78 |
| F | 100 | 1.5 | 0.75 | 10.0 | | 81 | 87 | 70 |
| G | 100 | 1.5 | 0.75 | 2.7 | 7.3 | 70 | 89 | 62 |
| H | 50 | 1.5 | 0.75 | 2.7 | 7.3 | 84 | 89 | 75 |
| I | 50 | 1.5 | 0.75 | 10.0 | | 93 | 86 | 80 |

Run G shows a reduced ethylene yield due to a lower ethane conversion when a steam diluent is employed. However, lowering the space velocity, Run H, the conversion is restored to higher levels and the ethylene yield is also raised to the higher levels.

Example 10

The further catalytic effect of the metals from the other groups in the Periodic Chart of Elements are illustrated in Tables XVI, XVII, and XVIII using the dehydrogenation of ethylbenzene to styrene as the example. The wide variety of metallic catalysts which can be used is clearly indicated.

TABLE XVI

[5% metal oxide deposited on Alundum base (surface area <0.1 m.²/g.); ethylbenzene/$H_2S$/$O_2$/He mole ratio—1/1/0.6/10; temperature—1150° F.; ethylbenzene space velocity—0.6 w./w./hr.]

| Run No. | Catalyst Metal | Ethylbenzene Conversion, percent | Selectivity to Styrene, percent | Styrene yield, percent |
|---|---|---|---|---|
| M184 | Base Alone | 86.1 | 81.1 | 53.1 |
| M168 | Fe (VIII) | 69.0 | 81.5 | 56.3 |
| M172 | Mn (VII-B) | 72.0 | 75.6 | 54.8 |
| M176 | Cu (I-B) | 68.0 | 83.1 | 56.5 |
| M180 | U [1] | 73.7 | 80.0 | 59.0 |
| M186 | Ce [2] | 78.4 | 79.8 | 62.6 |

[1] Actinide series.
[2] Lathanide series.

TABLE XVII

[5% oxide or chloride deposited on alumina (surface area 4.3 m.²/g.); ethylbenzene/$H_2S$/$O_2$/He mole ratio—1/0.8/0.8/3.7; temperature—1200° F.; ethylbenzene space velocity—0.4 w./w./hr.]

| Run No. | Catalyst Promoter | Ethylbenzene Conversion, Percent | Selectivity to Styrene, Percent | Styrene Yield, Percent |
|---|---|---|---|---|
| M1041 | Didymium chloride | 87.7 | 76.2 | 66.9 |
| M1047 | CuO (I-B) | 82.4 | 79.4 | 65.4 |
| M1053 | ZnO (II-B) | 81.9 | 70.2 | 57.5 |
| M1059 | CdO (II-B) | 88.3 | 70.6 | 62.3 |
| M1069 | $Sb_2O_3$ (VA) | 84.0 | 67.7 | 56.9 |
| M1071 | $SnO_2$ (IVA) | 78.4 | 74.8 | 58.7 |

TABLE XVIII

[Ethylbenzene/$H_2S$/$O_2$/He mole ratio—1/0.8/0.8/10; temperature—1200° F.; ethylbenzene space velocity—0.4 w./w./hr.]

| Run No. | Catalyst Components | L Wt. Ratio | m²/g. | Ethylbenzene Conversion, Percent | Sel. to Styrene, Percent | Styrene Yield, Percent |
|---|---|---|---|---|---|---|
| W11 | $MnO_2/Al_2O_3$ (VII-B) | 19/81 | 69 | 82.1 | 72.0 | 59.1 |
| W21 | $WO_3$—(VI-B) | 100 | 17 | 88.7 | 84.8 | 71.0 |
| W26 | $Fe_2O_3/Al_2O_3$ (VIII) | 20/80 | 41 | 83.8 | 71.8 | 51.7 |
| W31 | $Cr_2O_3/Al_2O_3$ (VI-B) | 12/88 | 50 | 81.6 | 61.9 | 50.5 |
| W36 | $Al_2O_3$ (III-A) | 100 | 6 | 81.4 | 83.0 | 67.5 |
| W41 | MgO (II-A) | 98 | 21 | 72.8 | 74.0 | 53.8 |
| W48 | $BaCl_2$/C (II-A) | 27/73 |  | 77.7 | 65.2 | 50.6 |
| W53 | $Ca_3Ni(PO_4)_6$ | 100 | 10 | 89.5 | 72.3 | 64.3 |
| W58 | Mordenite [1] |  | 560 | 90.0 | 79.0 | 71.2 |

[1] While mordenites generally have large surface areas, it is believed that the ethylbenzene molecule is too large to enter into the internal pores of this structure and, therefore, the effective surface area for this reaction is quite low.

Example 11

The product yields in the $H_2S$/$O_2$ dehydrogenation of light paraffins is also markedly improved by adding various catalyst metals to a catalyst base. This is clearly illustrated in Table XIX which shows the dehydrogenation of ethane to ethylene and in Table XX which shows the dehydrogenation of n-butane to butenes plus butadiene.

TABLE XIX

5% metal deposited on 5.8 m.²/g. alumina as its oxide; ethane/$H_2S$/$O_2$/He mole ratio—1/1.5/75/10; temperature—1300° F.; ethane space velocity—0.25 w./w./hr.]

| Catalyst Metal | Ethane Conversion, Percent | Selectivity to Ethylene, Percent | Ethylene Yield, Percent |
|---|---|---|---|
| Base Alone [1] | 81 | 51 | 41 |
| In (III-A) | 85 | 76 | 64 |
| Ag (I-B) | 77 | 78 | 60 |
| Pb (IV-A) | 82 | 74 | 61 |
| Ti (IV-B) | 81 | 79 | 64 |

[1] At 1,350° F.

TABLE XX

[5% metal deposited on Alundum as its oxide; n-butane/$H_2S$/$O_2$/He—1/3.5/1.25/10; temperature—1025° F.; butane space velocity—0.25 w./w./hr.]

| Catalyst Metal | Butane Conversion, Percent | Selectivity to $C_4$ Olefins, Percent | Yield of $C_4$ Olefins, Percent | Butadiene Butene Ratio in Product |
|---|---|---|---|---|
| Base Alone | 32.1 | 57.4 | 18.7 | 0.57 |
| Co (VIII) | 28.6 | 56.4 | 16.2 | 0.03 |
| Cd (II-B) | 39.5 | 65.6 | 25.9 | 1.32 |
| Bi (V-A) | 37.8 | 68.8 | 26.0 | 1.90 |

Example 12

The effect of temperature on the dehydrogenation of cyclohexane was studied by passing a mixture of cyclohexane/$H_2S$/$O_2$/He in the mole ratio of 1/1.2/0.8/10 over 38.3 grams of 8.7 m.²/g. alumina catalyst at 0.5 g. cyclohexane/g. catalyst/hour space velocity. The results are summarized in Table XXI below:

TABLE XXI

| Run No. | Temp., °F. | Percent Cyclohexene Conversion | Percent Selectivity to— | | Percent Yield of— | |
|---|---|---|---|---|---|---|
| | | | Cyclohexane | Benzene | Cyclohexene | Benzene |
| C3 | 1,150 | 59.4 | 8.9 | 25.7 | 5.3 | 15.3 |
| C4 | 1,000 | 43.6 | 20.2 | 66.9 | 8.8 | 29.2 |
| C6 | 900 | 40.9 | 18.7 | 60.1 | 7.6 | 24.6 |

The results indicate that the highest cyclohexene and benzene yields are obtained at a temperature of about 1000° F.

Example 13

An $H_2S$/$SO_2$ gas mixture can also be used to dehydrogenate light normal paraffins. Thus, Table XXII below shows that high conversions and selectivities can be obtained in the dehydrogenation of ethane, propane and n-butane using a 5–9 m.²/g. alumina catalyst at hydrocarbon space velocities between 0.25 and 0.5 w./w./hr.

Example 14

The effect of utilizing a combined oxidizing agent of oxygen and a sulfur oxide was measured by reacting ethylbenzene/$H_2S$/$O_2$/helium in the molar ratios of 1/0.6/0.3/(10-$SO_2$) over a 9.8 m.²/g. alumina catalyst at 1150° F. and adding varying quantities of $SO_2$ to the

TABLE XXII

| Hydrocarbon Feed | Mole/Mole Hydrocarbon | | | Temp., °F. | Conv., Percent | Selectivity to Olefin, Percent | Olefin Yield, Percent |
|---|---|---|---|---|---|---|---|
| | $H_2S$ | $SO_2$ | He | | | | |
| Ethane | 0.2 | 0.5 | 3 | 1,300 | 67 | 68 | 45 |
| Propane | 0.2 | 0.5 | 3 | 1,200 | 76 | 47 | 36 |
| N-butane | 1.4 | 1.0 | 9 | 1,150 | 62 | 58 | [1] 36 |

[1] Butadiene/butene ratio in product, 0.57.

feed mixture. Table XXIII shows the results obtained using an ethylbenzene space velocity of 0.6 w./w./hr.

TABLE XXIII

| Run No. | Mole $SO_2$ per mole Ethylbenzene | Ethylbenzene Conversion, percent | Selectivity to Styrene | Styrene Yield, percent |
|---|---|---|---|---|
| M147-4 | 0 | 59.0 | 83.5 | 48.0 |
| M371 | 0.1 | 81.4 | 90.7 | 74.8 |
| M372 | 0.2 | 90.4 | 87.9 | 79.4 |
| M373 | 0.4 | 93.6 | 881. | 82.5 |

The data in the above table clearly show that high dehydrogenation product yields can be achieved by using a mixture of oxygen and sulfur dioxide as the oxidizing agent for $H_2S$. Adiabatic reaction conditions can readily be obtained by selecting the appropriate oxygen and $SO_2$ concentrations.

Example 15

The effect of $H_2S$ on the $SO_2$ dehydrogenation of ethylbenzene was determined by passing a feed mixture consisting of ethylbenzene and helium in the mole ratio of 1 to 10 over a 9.8 m.²/g. surface area alumina catalysts at 1200° F. and then adding $SO_2$ and $H_2S$ to the feed. Table XXIV shows the results obtained when using an ethylbenzene space velocity of 0.6 w./w./hr.

TABLE XXIV

| Run No | M48 | M572-1 | M571-1 |
|---|---|---|---|
| $SO_2$, Mole/Mole Ethylbenzene | 0 | 0.4 | 0.4 |
| $H_2S$, Mole/Mole Ethylbenzene | 0 | 0 | 0.1 |
| Mole Percent Yield Summary: | | | |
| Ethylbenzene Conversion | 46.6 | 80.1 | 83.9 |
| Styrene Selectivity | 92.2 | 84.6 | 91.3 |
| Styrene Yield | 43.3 | 67.6 | 76.6 |

The above table clearly shows that while the addition of $SO_2$ to the ethylbenzene feed increased the styrene yield over that obtained thermally in Run M48, the addition of as little as 0.1 mole of $H_2S$ together with the $SO_2$ caused a further marked increase in the styrene yield.

Example 16

The effect of $SO_2$ concentration on the $H_2S/SO_2$ dehydrogenation of ethylbenzene was studied by passing a feed mixture consisting of ethylbenzene/$H_2S$/He in a mole ratio of 1/0.5/10 over a 9.8 m.²/g. surface area alumina catalyst at 1180° F. and then adding increasing quantities of $SO_2$ to the feed mixture. Table XXV shows the results obtained when using an ethylbenzene space velocity of 0.6 w./w./hr.

TABLE XXV

| Run No | M344 | M345 | M346 | M347 | M361 |
|---|---|---|---|---|---|
| $SO_2$, Mole/Mole Ethylbenzene | 0.1 | 0.2 | 0.3 | 0.5 | 0.8 |
| Mole Percent Yield Summary: | | | | | |
| Ethylbenzene Conversion | 62.6 | 78.6 | 89.5 | 97.8 | 99.0 |
| Styrene Selectivity | 91.1 | 91.6 | 90.7 | 85.9 | 75.2 |
| Styrene Yield | 57.1 | 72.0 | 81.2 | 83.8 | 74.5 |

The data in Table XXV clearly show that high styrene yields can be achieved using $H_2S/SO_2$ mixtures to dehydrogenate ethylbenzene. Very high conversions of ethylbenzene can also be attained.

Example 17

The effect of utilizing $SO_3$ (in the form of 98% $H_2SO_4$) as the oxidant for $H_2S$ in the dehydrogenation of butene-1 is shown in Table XXVI.

TABLE XXVI
[Butene/$H_2S$/He mole ratio—1/0.8/(10-$H_2SO_4$); alumina catalyst, 5.5 m.²/g. surface area; temperature—1100° F.; butene space velocity—0.5 w./w./hr.]

| Run No | B169 | B170 | B171 |
|---|---|---|---|
| Mole $H_2SO_4$/Mole Butene | 0.1 | 0.2 | 0.4 |
| Mole Percent Yield Summary: | | | |
| Butene Conversion | 56.5 | 68.4 | 82.5 |
| Butadiene Selectivity | 94.1 | 96.6 | 90.7 |
| Butadiene Yield | 53.1 | 66.1 | 74.8 |

The data in Table XXVI clearly show that an $H_2S/SO_3$ mixture can be used to achieve high dehydrogenation product yields and selectivities.

Example 18

Th effect of various diluents on the dehydrogenation of butene-1 was determined by passing a feed mixture of 1-$C_4H_8$/$H_2S$/$SO_2$ in the mole ratio of 1/0.5/1.5 over a 5.5 m.²/g. alumina catalyst at atmospheric pressure and a temperature of 1100° F. The results summarized in Table XXVII below, using a butene space velocity of 0.5 w./w./hr., indicate that helium, $CO_2$, $CH_4$, and mixtures thereof are suitable diluents.

TABLE XXVII

| Run No | B34 | B226 | B231 | B232 |
|---|---|---|---|---|
| Diluent | He | $CO_2$ | $CH_4$ | $CO_2$+$CH_4$ |
| Moles/Mole Butene | 9.0 | 8.5 | 8.5 | 4.0+4.5 |
| Mole Percent Yield Summary: | | | | |
| Butene Conversion | 94.0 | 88.3 | 92.1 | 83.0 |
| Butadiene Selectivity | 91.7 | 97.1 | 95.3 | 96.3 |
| Butadiene Yield | 86.2 | 85.8 | 87.8 | 80.0 |

Example 19

The chlorides of various metals can also be used to catalyze sulfur promoted oxidative dehydrogenation reactions. The results summarized in Table XXVIII below show that KCl, $CaCl_2$ and $CrCl_3$ are also suitable catalysts. Butene-1 is the hydrocarbon feed used at a space velocity of 0.25 w./w./hr.

TABLE XXVIII

| Run No. | Catalyst | Temp., °F. | Mole/Mole Butene | | | Butene Conv., Percent | Butadiene Sel., Percent | Butadiene Yield, Percent |
|---|---|---|---|---|---|---|---|---|
| | | | $H_2S$ | $SO_2$ | He | | | |
| B422 | KCl | 1,180 | 3.0 | 0.8 | 9.0 | 88.7 | 94.6 | 84.0 |
| B366 | $CaCl_2$ | 1,180 | 0.6 | 0.8 | 9.4 | 81.2 | 90.7 | 73.6 |
| B372 | $CrCl_3$ | 1,100 | 0.4 | 0.8 | 9.6 | 78.3 | 96.9 | 75.9 |

This table illustrates the catalytic activity of Group I-A, II-B, and VI-B metal chlorides.

What is claimed is:

1. A process for dehydrogenating organic feed compounds which comprises reacting, in the vapor phase, an organic compound having at least one

grouping with hydrogen sulfide and an oxidizing agent selected from the group consisting of oxygen, sulfur oxides, and mixtures thereof, the reaction being conducted in the presence of a low surface area catalyst and at a temperature of at least about 800° F.

2. The process of claim 1 wherein the oxidizing agent is $O_2$, the mole ratio of $O_2$ to feed is at least about 0.1/1 and the mole ratio of $O_2$ to $H_2S$ is not more than about 1.5/1.

3. The process of claim 1 wherein the oxidizing agent is $SO_2$, the molar ratio of $SO_2$ to feed is at least about 0.05/1 and the molar ratio of $H_2S$ to $SO_2$ is at least about 0.03/1.

4. The process of claim 1 wherein the oxidizing agent is $SO_3$, the molar ratio of $SO_3$ to feed is at least about 0.04/1 and the molar ratio of $H_2O$ to $SO_2$ is at least about 0.04/1.

5. The process of claim 1 wherein a heat balanced process is effected and the oxidizing agent is a mixture of oxygen and a sulfur oxide.

6. The process of claim 1 wherein the surface area of the catalyst is below about 100 m.$^2$/gm.

7. The process of claim 1 wherein the low surface area catalyst is selected from the group consisting of difficulty reducible oxides and chlorides.

8. The process of claim 1 wherein at least about 1 mole of inert diluent per mole of feed is employed.

9. A process for dehydrogenating $C_2$–$C_{20}$ feed hydrogen having at least one $$\begin{array}{c} H\ H \\ |\ \ | \\ -C-C- \\ |\ \ | \end{array}$$

grouping which comprises reacting, in the vapor phase, the feed hydrocarbon, hydrogen sulfide and an oxidizing agent selected from the group consisting of oxygen, sulfur oxides, and mixtures thereof, such that when oxygen is the oxidizing agent the $O_2$/feed molar ratio and $O_2$H$_2$S molar ratio are at least about 0.1/1 and not more than 1.5/1, repsectively, when $SO_2$ is the oxidizing agent the $SO_2$/feed molar ratio and $H_2S$/$SO_2$ molar ratio is at least about 0.05/1 and at least about 0.03/1, respectively, and when $SO_3$ is the oxidizing agent the $SO_3$/feed molar ratio and $H_2S$/$SO_3$ molar ratio is at least about 0.04/1, and at least about 0.04/1, respectively, the reaction being conducted in the presence of a low surface area catalyst selected from the group consisting of difficulty reducible oxides and chlorides, the catalyst having a surface area below about 100 m.$^2$/gm., and conducting the reaction at temperatures ranging from about 800° to about 1400° F.

10. The process of claim 9 wherein the temperature ranges from about 950°–1300° F.

11. The process of claim 9 wherein the feed is selected from the group consisting of $C_2$–$C_6$ paraffins, $C_4$–$C_6$ monoolefins, $C_6$–$C_8$ naphthenes, and $C_8$–$C_{10}$ alkyl aromatics.

12. The process of claim 11 wherein the catalyst is a chloride and is selected from the group consisting of Group I-A, Group II-A, Group VI-B metal chlorides, and mixtures thereof.

13. The process of claim 12 wherein the chloride is potassium chloride.

14. The process of claim 12 wherein the chloride is calcium chloride.

15. The process of claim 12 wherein the chloride is chromium chloride.

16. The process of claim 11 wherein an inert diluent is employed in an amount of about 1–20 moles per mole of feed.

17. The process of claim 11 wherein the catalyst is an oxide selected from the group consisting of Group II, III, IV, V, VI-B metal oxides, and mixtures thereof, wherein the oxides are usable as catalytic support materials.

18. The process of claim 17 wherein the catalyst additionally contains an agent selected from the group consisting of metals, salts, oxides, and hydroxides of Group I–VIII metals.

19. The process of claim 18 wherein the additional catalyst agent is a Group I–VIII metal oxide.

20. The process of claim 18 wherein the additional catalyst agent is a Group I–VIII metal chloride.

21. The process of claim 17 wherein the metal is selected from the group consisting of Group II-A, V-B, and VI-B metals.

22. The process of claim 11 wherein the catalyst is comprised of alumina.

23. The process of claim 22 wherein the surface area of the catalyst ranges from 0.5–12 m.$^2$/gm.

24. A process for producing an unsaturated organic compound from an organic feed stock having 2–20 carbon atoms and containing at least one $$\begin{array}{c} H\ H \\ |\ \ | \\ -C-C- \\ |\ \ | \end{array}$$

group by dehydrogenating said group which comprises a vapor phase reaction of said feed stock with an oxidizing agent selected from the group consisting of oxygen, sulfur oxide, and mixtures thereof, such that when oxygen is the oxidizing agent the molar ratio of oxygen to feed and $H_2S$ to oxygen is at least 0.5/1 and at least 0.67/1, respectively, when $SO_2$ is the oxidizing agent, the molar ratio of $SO_2$ to feed and $H_2S$ to $SO_2$ is at least 0.3/1 and 0.1/1 to 10/1, respectively, and when $SO_3$ is the oxidizing agent, the molar ratio of $SO_3$ to feed and $H_2S$ to $SO_3$ is at least about 0.25/1 and 0.1/1 to 13/1, respectively, the temperature is in the range of 800° to 1400° F. and the reaction takes place in the presence of a catalytic support material having a surface area below about 100 m.$^2$/gm.

25. The process of claim 24 wherein the oxidizing agent is oxygen.

26. The process of claim 24 wherein the oxidizing agent is sulfur dioxide.

27. The process of claim 24 wherein the oxidizing agent is sulfur trioxide.

28. The process of claim 24 wherein the reaction is carried out in the presence of 1 to 20 moles of an inert diluent per mole of feed.

29. The process of claim 24 wherein the organic feed stock is a hydrocarbon selected from the group consisting of $C_2$–$C_6$ paraffins, $C_4$–$C_6$ monoolefins, $C_6$–$C_8$ naphthenes, and $C_8$–$C_{10}$ alkyl aromatics.

30. The process of claim 29 wherein the feed stock is butane and the unsaturated compound is selected from the group consisting of butene, butadiene, and mixtures thereof.

31. The process of claim 29 wherein the organic feed stock is ethylbenzene and the unsaturated product is styrene.

32. The process of claim 29 wherein the organic feed stock is cyclohexane and the unsaturated product is benzene.

33. The process of claim 29 wherein the organic feed stock is propylene and the unsaturated products are cyclohexene and benzene.

34. The process of claim 29 wherein the catalytic support material is selected from the group consisting of silica, silica-alumina, alumina, magnesia, and titania.

35. The process of claim 34 wherein the reaction is carried out in the additional presence of a catalyst selected from the group consisting of the oxides and hydroxides of Group I-A and Group II-A metals.

36. The process of claim 34 wherein the catalytic support material is alumina.

37. The process of claim 29 wherein the reaction is carried out at a contact time of 0.05 to 2 weights of feed stock per weight of catalyst per hour.

38. A process for producing a relatively more highly unsaturated hydrocarbon from a relatively less unsaturated hydrocarbon which comprises a vapor phase reaction of a $C_2$–$C_8$ hydrocarbon with at least 0.5 mole of oxygen per mole of unsaturation in the reaction product and at least 0.67 mole of $H_2S$ per mole of oxygen at a temperature of about 950–1300° F. in the presence of 1–20 moles of an inert diluent per mole of hydrocarbon feed and a catalytic support material having a surface area below about 100 m.²/gm.

References Cited

UNITED STATES PATENTS 2,315,107 3/1943 Chickenoff et al. ___ 260—683.3
2,720,550 10/1955 Danforth _____ 260—668
3,247,278 4/1966 Garwood et al. _____ 260—683.3

DELBERT E. GANTZ, *Primary Examiner.*

V. O'KEEFE, *Assistant Examiner.*

PO-1050
(5/69)

UNITED STATES PATENT OFFICE
CERTIFICATE OF CORRECTION

Patent No. 3,403,192          Dated September 24, 1968

Inventor(s)  Mohan Vadekar and Israel S. Pasternak

It is certified that error appears in the above-identified patent and that said Letters Patent are hereby corrected as shown below:

(a) Column 1, lines 15-18, please cancel the formula $$"-\underset{H}{\overset{\;}{C}}-\underset{C}{\overset{\;}{C}}-"$$

and substitute therefor the following formula $$--\underset{H}{\overset{H}{C}}-\underset{H}{\overset{C}{C}}---;$$

(b) Column 6, line 42, cancel "retired" and substitute therefor --desired--;

(c) Column 7, line 62, cancel "1-$C_4H_8H_2S$/He" and substitute therefor --1-$C_4H_8$/$H_2S$/He --;

(d) Column 9, line 35, cancel " 0.4 w./w./w./hr. " and substitute therefor -- 0.4 w./w./hr. --;

(e) Columns 9-10, TABLE IX, Run C, cancel "0.0" under the column heading "$H_2S$" and substitute therefor --0.2--;

(f) Columns 13-14, TABLE XXI, cancel "Percent Cyclohexene Conversion" and substitute therefor --Percent Cyclohexane (cont'd. on next pa

PO-1050
(5/69)

UNITED STATES PATENT OFFICE
CERTIFICATE OF CORRECTION

Patent No. 3,403,192    Dated September 24, 1968

Inventor(s) Mohan Vadekar and Israel S. Pasternak

It is certified that error appears in the above-identified patent and that said Letters Patent are hereby corrected as shown below:

Conversion--; under the column heading "Percent Selectivity to" cancel "Cyclohexane" and substitute therefor --Cyclohexene--;

(g) Column 17, Claim 4, line 11, cancel "$H_2O$" and substitute therefor --$H_2S$--;

(h) Column 17, Claim 7, line 19, cancel "difficulty" and substitute therefor --difficultly--;

(i) Column 17, Claim 9, line 34, cancel "$O_2H_2S$" and substitute therefor --$O_2/H_2S$--; same claim, line 43, cancel "difficulty" and substitute therefor --difficultly--.

Signed and sealed this 13th day of April 1971.

(SEAL)
Attest:

EDWARD M. FLETCHER, JR.          WILLIAM E. SCHUYLER, JR.
Attesting Officer                Commissioner of Patents